United States Patent Office 2,815,201
Patented Dec. 3, 1957

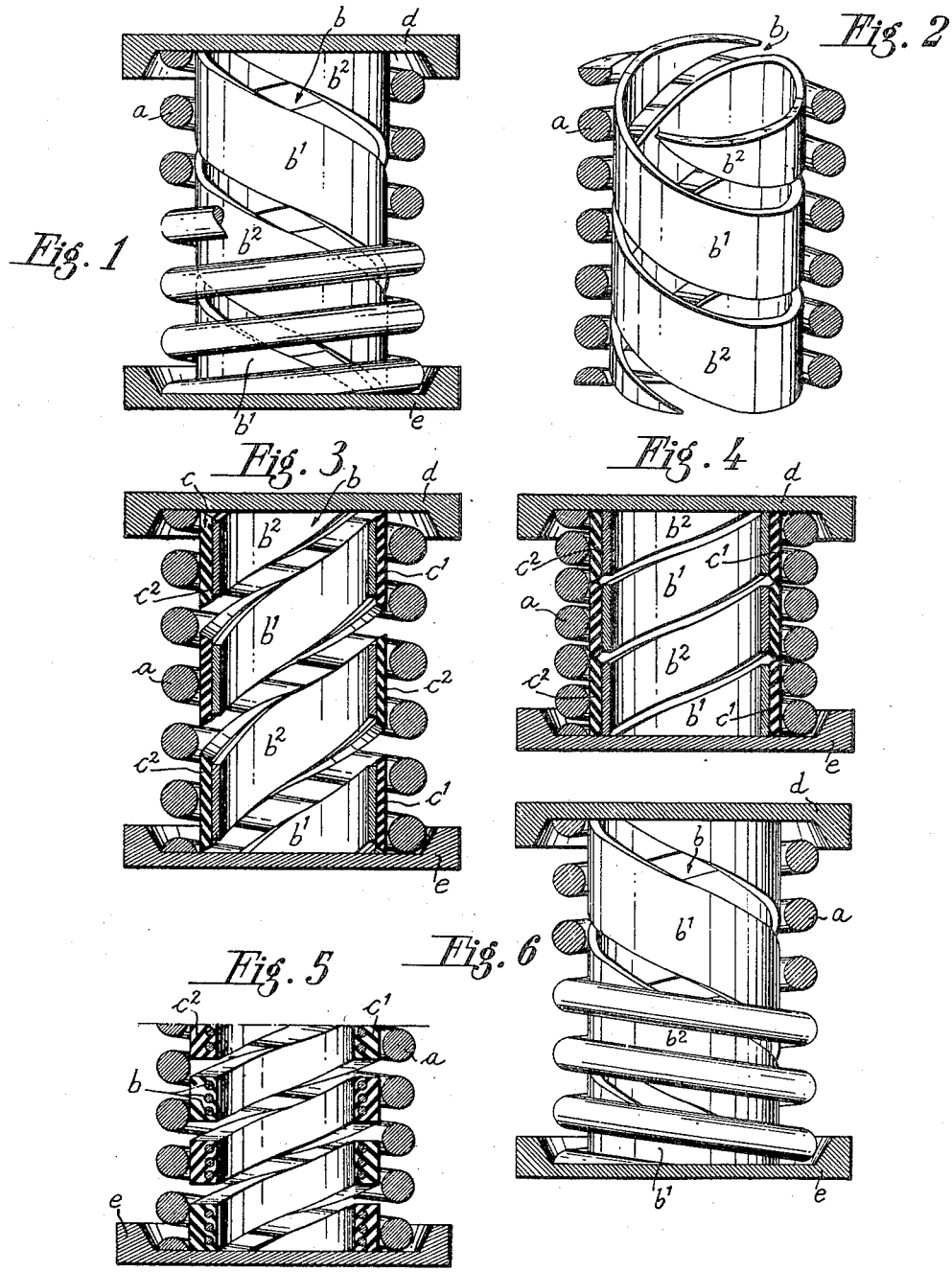

2,815,201

ELASTIC DEVICE

Henri Girod-Eymery, Paris, France, assignor to Societe d'Etudes Ferroviaires, Uzes, France, a French body corporate Application February 15, 1955, Serial No. 488,338

Claims priority, application France February 17, 1954

10 Claims. (Cl. 267—9)

The present invention relates to an elastic device comprising concentric cylindrical helical springs. The object of the invention is to provide such a device which works under compression and has a certain internal damping effect in respect of the reciprocations of the springs and of their high frequency vibrations.

This device, which is more particularly for the suspension of vehicles, is characterized in that it comprises an outer helical spring having a fine pitch and an inner helical spring disposed concentrically with a slight clearance therebetween when assembled or without clearance, at least one of the springs comprising wholly or partly an elastically deformable material, the pitch of the inner spring being greater than that of the outer spring and of such size that when the device is compressed the diametral expansion of the inner spring brings the outer face of its coils to bear elastically against the inner face of the coils of the outer spring thereby creating friction capable of damping the vibrations and reciprocations of the spring unit.

Preferably the outer spring is adapted to support the major part of the load and is therefore advantageously of a metal such as steel, whereas the inner spring could be partly or wholly of a material elastically deformable. Thus the inner spring may comprise a composite spring the outer part of which is of a natural or synthetic material being elastically deformable as well as having a high resistance to wear by abrasion.

The inner spring may be entirely of a natural material such as rubber or of a synthetic material being elastically deformable, this material being contingently provided with one or several reinforcing metal springs embedded in the mass or reinforced by an internal lining which is not metal.

In order to facilitate the frictional contact between the coils of the two springs the frictional surface of the coils of the inner spring or the outer spring or of both springs is advantageously cylindrical, thus one of the springs or both of them may have coils having a polygonal cross-section and in particular the inner spring may comprise a flat strip formed into a helix. Further, the two springs are advantageously wound in opposite directions so as to obtain a more intense pivotal friction between their coils and hence a more energetic damping, although the springs could be wound in the same direction.

The two springs and in particular the inner spring may have a single helix or a plurality of helices each of these helices having the same pitch but not necessarily having the same cross section nor necessarily being of the same nature.

The invention will be better understood from the ensuing description with reference to the accompanying drawing given merely by way of example and in which:

Fig. 1 is an elevational view partly in section of an elastic device embodying the invention;

Fig. 2 is a perspective view partly in section of the device shown in Fig. 1;

Fig. 3 is a longitudinal sectional view of a modification of the device, the latter being in a non-compressed position;

Fig. 4 is a sectional view similar to that of Fig. 3, the device having been compressed;

Fig. 5 is a longitudinal sectional view of a third modification, and

Fig. 6 is a view similar to Fig. 1 illustrating a modification of the embodiment shown in this latter figure.

According to the embodiment shown in Figs. 1 and 2, the elastic device comprises two concentric helical springs $a$ and $b$. The outer spring $a$ has coils having a circular cross-section, has a small pitch and is of metal, such as steel. The spring $b$ has coils having a rectangular cross-section and a pitch definitely larger than that of the spring $a$, the coils of this spring $b$ being heavily inclined relative to planes perpendicular to its axis. In this example, the spring $b$ has two helices $b^1$ and $b^2$, although it could very well have a single helix or more than two helices. In this device the spring $b$ is shown to be entirely of a material which is elastically deformable.

The two helices $b^1$ and $b^2$ are wound in the opposite direction to those of the spring $a$. Both of them have the same diameter, the latter being such that in the free or uncompressed state of the spring the outer face of the coils of the spring $b$ are in the near vicinity of or in contact with the inner face of the coils of the spring $a$.

The two springs $a$ and $b$ bear against two cups $d$ and $e$ secured to the members between which the elastic device is interposed and serves, for example, as a suspension.

The operation of the device shown in Figs. 1 and 2 will now be examined.

When under load, the elastic device is compressed and the spring $a$ does not vary substantially in diameter owing to the small inclination of its coils, whereas the inner spring $b$, whose coils have a greater inclination, undergoes a diametral expansion which is not inconsiderable. Hence, the spring $b$ tends to bear the more strongly against the interior of the coils of the spring $a$ as the load borne by the device is greater. When such an elastic application of the spring $b$ against the spring $a$ occurs, the coils of these two springs are no longer free and their own high-frequency vibrations are thereby braked or damped.

Further, if the device is compressed still more after the spring $b$ has been applied against the inner face of the coils of the spring $a$, the spring $b$, the diametral expansion of which is hampered and which is incapable of sliding relative to the support cups $d$ and $e$, has its developed length decreased and this causes an elastic longitudinal compression of this spring and in consequence an increasing elastic pressure of the coils against those of the outer spring $a$.

The variations in the compression of the device result in pivotal friction between the coils of the spring $a$ and those of the spring $b$ owing to the variations in the relative inclination of these coils. Moreover there also occurs a relative sliding of the coils in the direction parallel to the axis of the device at the point where two or several coils of the spring $a$ bear against the same generatrix of the outer face of a coil of the spring $b$. These various frictions result in a damping of the relative reciprocatory displacements of the two members between which the spring unit is interposed. The elastic device embodying the invention is therefore self-damped, which constitutes an interesting feature in numerous applications and notably in its application in the suspension of vehicles.

As mentioned above, a metal inner spring $b$ may be used, the outer face of this spring being provided with an element or layer of an elastically deformable material which is abrasion-resistant and is fixed to the spring. This element may also be fixed to the inner face of the coils of the spring $a$. By way of example, Figs. 3 and 4 show the first of these two arrangements. This embodiment differs from the embodiment shown in Figs. 1 and 2 in the following manner:

(a) The spring $b$ comprises two helices $b^1$ and $b^2$, in this example metal, a layer of a rubber-like elastic material $c$ in the form of two helices $c^1$ and $c^2$ being provided on the outer face of the helices $b^1$ and $b^2$.

(b) The layer of elastic material $c$, having two helices $c^1$ and $c^2$, has a trapezoidal cross-section. This is advantageous when its coils contact one another as a result of an appreciable compression of the device (see Fig. 4). This advantage will be explained hereinunder.

The metal spring $b$, instead of being provided with an outer layer of an elastic material, may be embedded in the helix of an elastic material $c$, preferably in the neighbourhood of the inner face of the latter. This embodiment has been shown in Fig. 5, where the metal spring comprises metal wires $b$ embedded in the helix $c$.

In the case of the example shown in Figs. 3 and 4, the deformability of the material constituting the coils of the element $c$ permits the diametral expansion of the coils of the spring $b$ and ensures that the action of the inner spring $b$ on the coils of the spring $a$ is progressive.

The deformation of the elastic element between the two springs $a$ and $b$ increases with compression of the device between the cups $d$ and $e$, i. e. with increase in the load. If the relative decrease in the thickness of the elastic element becomes great enough, the rigidity against compression of the latter appreciably increases and is manifested by a force which opposes the expansion of the inner spring and increases more rapidly than the load on the elastic device. The latter will therefore exhibit a decreasing flexibility corresponding to increasing loads. This feature is advantageous in the construction of a device having a variable flexibility, which is notably of use in the suspension of vehicles. However, the characteristics of the elastic element $c$ and, in particular, its thickness, may be so selected that the flexibility of the spring unit remains more or less constant within the limits of compression of the elastic device in normal service. In particular it is possible to construct the elastic element $c$ of a material which is sufficiently elastically deformable and which has in consequence a modulus of elasticity which is low enough for almost the entire load on the elastic device to be supported conjointly by the metal springs $a$ and $b$, while the element $c$ participates only to a limited extent in the elastic resistance of the spring unit.

With further reference to the device shown in Fig. 3, if the compression of the spring unit is increased still more, the coils of the inner spring in the end touch one another at the base of their element or cover (the part in contact with the coils of the spring $a$). Thenceforth, any further decrease in the height of the spring unit brings about a compression of the coils of the helicoidal element $c$ of elastic material in the direction of the axis of the spring and in consequence an increase in the total rigidity of the spring unit. Preferably, this property may be used in producing a progressive elastic abutment effect when the compression of the spring accidently exceeds a given limit provided for in the normal use of the device. This abutment effect may be used in particular for protecting the spring $a$ against any possible locking of its coils under the effect of a momentary high overload. To this end, the dimensions of the inner helix $c$ are selected preferably so that the spring unit operates normally in such position that it remains within a position which corresponds to the application of the coils of the element $c$ against those of the spring $a$ and a position which corresponds to the commencement of the contact between the coils of the helix $c$.

The elastic characteristics of the spring unit and in particular the damping effect obtained, depend on the characteristics of the different elements constituting this unit and in particular the following:

(a) The free length of the spring $b$ and of the element $c$ compared to that of the spring $a$.

(b) The radial clearance or space between the coils of the element $c$ and those of the spring $a$ in the free state.

(c) The pitch of the helix or helices forming the spring $b$ and its element $c$.

(d) The shape and the cross-sectional area of the element $c$ and the modulus of elasticity of the material from which it is made.

The metal spring $b$ co-operates with the spring $a$ to a varying degree, according to its rigidity, in supporting the load.

The operation of the embodiment shown in Fig. 5, in which the metal part of the inner spring consists of steel wires, is very similar to that of the device shown in Figs. 3 and 4.

Thus it can be seen that, according to the invention, it is very easy to obtain an elastic device which has an internal damping effect and if need be a variable flexibility, and which affords, furthermore, an elastic abutment effect at the end of its travel. This device has notably the following advantages:

(a) A very large useful travel is available since all the component parts of the elastic device are in the form of helical springs; this permits applying the device to the suspension of automobiles.

(b) When an inner spring provided with an elastic material such as rubber is utilized, the present device does not exhibit the disadvantages of other elastic devices utilizing rubber. This is the result of the limited participation of the rubber in the elastic resistance of the spring unit. Thus, according to the invention, the hardening subsequent to the aging of the rubber and variations in its modulus of elasticity subsequent to variations in ambient temperature, hardly after the elastic properties of the device. Further, the slow creep of the rubber under load, does not result in the device sinking appreciably. Finally, it is possible to utilize different grades of rubber or synthetic material whose essential property is high resistance to abrasion. The elasticity of the element $c$ may be, if desired, dispensed with since the internal deformations of the material constituting the element $c$ may be rendered extremely small if it is desired.

(c) The same advantages are to be found when an inner spring $b$ is wholly constituted of a very elastic synthetic or natural material, such as for example rubber.

(d) The device may be very easily incorporated in existing suspensions comprising either solely a helical spring or an assemblage of concentric helical springs. It is merely necessary to insert a suitably selected inner spring in the outer spring. In particular, it is possible to determine this inner spring in such manner as not to modify in an appreciable manner the rigidity of the suspension.

Although specific embodiments of the invention have been described hereinbefore many modifications and changes may be made therein without departing from the spirit of the invention, or the scope of the appended claims.

Thus the springs $a$ and $b$, and contingently the element $c$, may have any cross-section. Similarly, the height of the helices $a$ on the one hand, $b$ or $b$ and $c$ on the other, may or may not be different in the free state (when assembling).

If the spring $b$ or the spring $a$ has an elastic element or layer the surface of this element may be smooth, rough or uneven and in particular comprise grooves or ribs.

The axial clearance in the free state, or under normal load, between the coils of the spring $b$ or the element $c$ are not critical and in particular may be such that the effect of elastic abutment is not obtained, although it is preferable to provide this.

As already mentioned, the inner and outer springs may be wound in opposite directions or in the same direction. Fig. 6, for example, illustrates an embodiment of the invention similar to that of Fig. 1, except that the inner and outer springs are wound in the same direction.

The inner and outer springs may each comprise a single helix or a plurality of helices. In the latter case, the helices constituting a spring may be either identical or different from one another in respect of their cross-section or of their constitution (homogeneous or otherwise) or of the nature of the material from which they are made up.

Having now described my invention what I claim as new and desire to secure by Letters Patent is:

1. An elastic device, in particular for the suspension of vehicles, comprising an outer helical spring having a small pitch and being of metal, and an inner helical spring disposed inside and adjacent the outer spring and concentrically therewith, the inner spring being composed entirely of rubber and having a pitch which is greater than the pitch of the outer spring, whereby when the device is compressed, the diametral expansion of the inner spring and the reduction of the developed length of its helix bring the inner spring to bear elastically against the inner face of the outer spring thereby creating friction capable of damping the vibrations and reciprocations of the two springs.

2. An elastic device, in particular for the suspension of vehicles, comprising an outer helical spring having a small pitch and being of metal, and an inner helical spring disposed inside and adjacent the outer spring and concentrically therewith, the inner spring comprising a rubber-like elastic material and having a pitch which is greater than the pitch of the outer spring, whereby, when the device is compressed, the diametral expansion of the inner spring and the reduction of the developed length of its helix bring the inner spring to bear elastically against the coils of the outer spring, and create friction capable of damping the vibrations and reciprocations of the device.

3. An elastic device, in particular for the suspension of vehicles, comprising an outer helical spring having a small pitch and being of metal, and an inner helical spring disposed inside and adjacent outer spring and concentrically therewith, the inner spring being composed of rubber-like elastic material and comprising on its inner face a helical reinforcing element composed of a material more rigid than the material of the inner spring, this inner spring having a pitch which is greater than the pitch of the outer spring, whereby, when the device is compressed, the diametral expansion of the inner spring and the reduction of the developed length of its helix bring the inner spring to bear elastically against the coils of the outer spring, and create friction capable of damping the vibrations and reciprocations of the device.

4. An elastic device, in particular for the suspension of vhicles, comprising an outer helical spring having a small pitch and being of metal, and an inner helical spring disposed inside and adjacent the outer spring and concentrically therewith, the inner spring being composed of rubber-like elastic material and comprising a helical reinforcing element composed of a material more rigid than the material of the inner spring, said reinforcing element being embedded inside said rubber-like elastic material, this inner spring having a pitch which is greater than the pitch of the outer spring, whereby, when the device is compressed, the diametral expansion of the inner spring and the reduction of the developed length of its helix bring the inner spring to bear elastically against the coils of the outer spring, and create friction capable of damping the vibrations and reciprocations of the device.

5. An elastic device as claimed in claim 4, wherein said reinforcing element is formed of an assemblage of threadlike elements embedded in the vicinity of the inner face of said inner spring.

6. An elastic device, in particular for the suspension of vehicles, comprising an outer helical spring having a small pitch and being of metal, and an inner helical spring disposed inside and adjacent the outer spring and concentrically therewith, the inner spring comprising a rubber-like elastic material and consisting of a plurality of imbricated helices having the same pitch, said pitch being greater than the pitch of the outer spring, whereby, when the device is compressed the diametral expansion of the inner spring and the reduction of the developed length of its helices bring the inner spring to bear elastically against the coils of the outer spring, and create friction capable of damping the vibrations and reciprocations of the device.

7. An elastice device, as claimed in claim 6, wherein the helices constituting the inner spring are wound in the opposite direction to the outer spring.

8. An elastic device, in particular for the suspension of vehicles, comprising an outer helical spring having a small pitch and being of metal, and an inner helical spring disposed inside and adjacent the outer spring and concentrically therewith, the inner spring being composed of rubber-like elastic material and comprising on its inner face a helical reinforcing element composed of a material more rigid than the material of the inner spring, this inner spring having a pitch which is greater than the pitch of the outer spring, whereby, when the device is compressed, the diametral expansion of the inner spring and the reduction of the developed length of its helix bring the inner spring to bear elastically against the coils of the outer spring, and create friction capable of damping the vibrations and reciprocations of the device, the inner spring being so constructed and arranged that its coils enter into contact with one another for a compression of the device in excess of a predetermined pressure and thereby exert an effect of elastic abutment and result in a decreasing flexibility at the end of the compressed travel.

9. An elastic device, in particular for the suspension of vehicles, comprising an outer helical spring having a small pitch and being of metal, and an inner helical spring disposed inside and adjacent the outer spring and concentrically therewith, the inner spring comprising a rubber-like elastic material and being wound in the opposite direction to the outer spring, the inner spring having a pitch which is greater than the pitch of the outer spring, whereby, when the device is compressed, the diametral expansion of the inner spring and the reduction of the developed length of its helix bring the inner spring to bear elastically against the coils of the outer spring, and create friction capable of damping the vibrations and reciprocations of the device.

10. An elastic device, in particular for the suspension of vehicles, comprising an outer helical spring having a small pitch and being of metal, and an inner helical spring disposed inside and adjacent the outer spring and concentrically therewith, the inner spring comprising a rubber-like elastic material and being wound in the same direction as the outer spring, the inner spring having a pitch which is greater than the pitch of the outer spring, whereby, when the device is compressed, the diametral expansion of the inner spring and the reduction of the developed length of its helix bring the inner spring to bear elastically against the coils of the outer spring, and create friction capable of damping the vibrations and reciprocations of the device.

References Cited in the file of this patent

UNITED STATES PATENTS

| 99,475 | Rhinelander | Feb. 1, 1870 |
| 134,646 | Culmer | Jan. 7, 1873 |
| 161,386 | Clooney | Mar. 30, 1875 |
| 758,066 | Harvey | Apr. 26, 1904 |
| 1,936,389 | Hallquist | Nov. 21, 1933 |

FOREIGN PATENTS

| 445,230 | Germany | June 27, 1937 |